US006403663B1

(12) United States Patent
DeSimone et al.

(10) Patent No.: US 6,403,663 B1
(45) Date of Patent: Jun. 11, 2002

(54) METHOD OF MAKING FOAMED MATERIALS USING SURFACTANTS AND CARBON DIOXIDE

(75) Inventors: Joseph M. DeSimone, Chapel Hill; Saad A. Khan; Joseph R. Royer, both of Cary; Richard J. Spontak; Teri Anne Walker, both of Raleigh, all of NC (US)

(73) Assignees: North Carolina State University, Raleigh; The University of North Carolina at Chapel Hill, Chapel Hill, both of NC (US)

( * ) Notice: Subject to any disclaimer, the term of this patent is extended or adjusted under 35 U.S.C. 154(b) by 0 days.

(21) Appl. No.: 09/399,993

(22) Filed: Sep. 20, 1999

(51) Int. Cl.$^7$ .................................................. C08J 9/00
(52) U.S. Cl. ............................ 521/97; 521/79; 521/91; 521/88; 521/87; 521/89; 521/94; 521/134
(58) Field of Search ........................... 521/131, 97, 79, 521/91, 88, 94, 89, 87, 134

(56) References Cited

U.S. PATENT DOCUMENTS

| | | | |
|---|---|---|---|
| 3,879,505 A | 4/1975 | Boutillier et al. ............. | 264/48 |
| 4,424,287 A | 1/1984 | Johnson et al. ............... | 521/74 |
| 4,466,933 A | 8/1984 | Huggard ...................... | 264/54 |
| 4,473,665 A | 9/1984 | Martin-Vvedensky et al. .......... | 521/79 |
| 4,673,695 A | 6/1987 | Aubert et al. ................. | 521/64 |
| 4,692,381 A | 9/1987 | Pecsok ....................... | 428/375 |
| 4,906,672 A | 3/1990 | Stone et al. ................. | 521/130 |

(List continued on next page.)

FOREIGN PATENT DOCUMENTS

| | | | |
|---|---|---|---|
| JP | 11-140210 | 5/1999 | .............. C08J/9/04 |
| WO | WO9947603 | 9/1999 | ........... C08L/67/00 |

OTHER PUBLICATIONS

CAPCE Newsletter, The Ohio State University vol. 1, Iss. 2, pp. 1–8, Winter/Spring 1999.
Baldwin et al.; An Extrusion System for the Processing of Microcellular Polymer Sheets: Shaping and Cell Growth Control, Polymer Engineering and Science, 36:10 1425–1435 (1996).
Baldwin et al.; A Microcellular Processing Study of Poly–(Ethylene Terephthalate) in the Amorphous and Semicrystalline States. Part II: Cell Growth and Process Design, Polymer Engineering and Science, 36:11 1446–1453 (1996).
Behravesh et al.; Approach to the Production of Low–Density, Microcellular Foams in Extrusion, Antec '98, 1958–1967, (1998).
Doroudiani et al.; Processing and Characterization of Microcellular Foamed High–Density Polyethylene/Isotactic Polypropylene Blends, Polymer Engineering and Science 38:7 1205–1215 (1998).
Elkovitch; Supercritical Fluid Assisted Polymer Blending, CAPCE Newsletter, The Ohio State University, p. 2, Summer/Autumn 1999.
Goel et al.; Generation of Microcellular Polymeric Foams Using Supercritical Carbon Dioxide. II: Cell Growth and Skin Formation, Polymer Engineering and Science 34:14 1148–1156 (1994).
Goel et al.; Nucleation and Growth in Microcellular Materials: Supercritical $CO_2$ as Foaming Agent, AIChE Journal 41:2 357–366 (1995).

(List continued on next page.)

Primary Examiner—James J. Seidleck
Assistant Examiner—Melanie D. Bagwell
(74) Attorney, Agent, or Firm—Myers, Bigel, Sibley & Sajovec, P.A.

(57) ABSTRACT

A method of producing a foamed material comprises contacting a material with a fluid mixture comprising carbon dioxide and a surfactant, wherein the surfactant facilitates the dissolution of the carbon dioxide into the material and then foam the material in the fluid mixture.

66 Claims, 2 Drawing Sheets

U.S. PATENT DOCUMENTS

| | | | |
|---|---|---|---|
| 4,940,733 A | 7/1990 | Kuphal et al. | 521/79 |
| 4,945,119 A | 7/1990 | Smits et al. | 521/131 |
| 5,037,859 A | 8/1991 | Williams, Jr. et al. | 521/55 |
| 5,066,684 A | 11/1991 | LeMay | 521/64 |
| 5,084,486 A | 1/1992 | Patten et al. | 521/126 |
| 5,120,559 A | 6/1992 | Rizvi et al. | 426/446 |
| 5,120,770 A | 6/1992 | Doyle et al. | 521/99 |
| 5,158,986 A | 10/1992 | Cha et al. | 521/82 |
| 5,160,674 A | 11/1992 | Colton et al. | 264/50 |
| 5,180,751 A | 1/1993 | Park et al. | 521/51 |
| 5,252,620 A | 10/1993 | Elliott, Jr. et al. | 521/149 |
| 5,269,987 A | 12/1993 | Reedy et al. | 264/50 |
| 5,286,429 A | 2/1994 | Blythe et al. | 264/51 |
| 5,288,740 A | 2/1994 | Park et al. | 521/58 |
| 5,302,624 A | 4/1994 | Reedy et al. | 521/81 |
| 5,312,846 A * | 5/1994 | Smits et al. | 521/134 |
| 5,334,356 A | 8/1994 | Baldwin et al. | 422/133 |
| 5,411,683 A | 5/1995 | Shah | 264/50 |
| 5,411,687 A | 5/1995 | Imeokparia et al. | 264/50 |
| 5,422,378 A | 6/1995 | Vo | 521/79 |
| 5,424,014 A | 6/1995 | Glorioso et al. | 264/45.3 |
| 5,451,633 A | 9/1995 | DeSimone et al. | 524/731 |
| 5,525,640 A | 6/1996 | Gerkin et al. | 521/112 |
| 5,589,105 A | 12/1996 | DeSimone et al. | 252/351 |
| 5,639,836 A | 6/1997 | DeSimone et al. | 526/201 |
| 5,670,102 A | 9/1997 | Perman et al. | 264/50 |
| 5,670,552 A | 9/1997 | Gusavage et al. | 521/91 |
| 5,674,916 A | 10/1997 | Shmidt et al. | 521/79 |
| 5,674,957 A | 10/1997 | DeSimone et al. | 526/89 |
| 5,676,705 A | 10/1997 | Jureller et al. | 8/142 |
| 5,683,977 A | 11/1997 | Jureller et al. | 510/286 |
| 5,684,055 A | 11/1997 | Kumar et al. | 521/79 |
| 5,698,665 A | 12/1997 | Odell | 528/480 |
| 5,707,573 A | 1/1998 | Biesenberger et al. | 264/50 |
| 5,780,521 A | 7/1998 | Shmidt et al. | 521/79 |
| 5,783,082 A | 7/1998 | DeSimone et al. | 210/634 |
| 5,789,454 A | 8/1998 | McVey | 521/112 |
| 5,801,210 A | 9/1998 | Radovich et al. | 521/130 |
| 5,821,273 A | 10/1998 | Venkataraman et al. | 521/79 |
| 5,830,393 A | 11/1998 | Nishikawa et al. | 264/50 |
| 5,833,930 A | 11/1998 | Sulzbach et al. | 422/133 |
| 5,922,493 A | 7/1999 | Humphrey, Jr. et al. | 429/316 |
| 6,169,139 B1 | 1/2001 | van Cleeff | 524/544 |

OTHER PUBLICATIONS

Wessling et al.; Carbon Dioxide Foaming of Glassy Polymers, Journal of Applied Polymer Science 53: 1497–1512 (1994).

Goel et al., "*Generation of Microcellular Polymeric Foams Using Supercritical Carbon Dioxide. II: Cell Growth and Skin Formation,*" Polymer Engineering and Science, 34:14, 1148–1156 (Jul. 1994).

Siripurapu et al., "*Microcelllular Polymeric Foams (MPFs) Generated Continuously in Supercritical Carbon Dioxide,*" Mat. Res. Soc. Symp. 629 FF9.9.1–FF9.9.6 (2000).

International Search Report, PCT/US01/06558, mailed Sep. 19, 2001.

* cited by examiner

METHOD OF MAKING FOAMED MATERIALS USING SURFACTANTS AND CARBON DIOXIDE

FIELD OF THE INVENTION

The invention generally relates to methods of making foamed materials employing carbon dioxide.

BACKGROUND OF THE INVENTION

Methods for making conventional foamed materials, such as for example thermoplastic materials, have long been known. These methods have focused primarily on employing chemical blowing agents that include various volatile organic compounds (VOCs) and chlorofluorocarbons (CFCs). These blowing agents typically decompose at a critical temperature and release a gas such as nitrogen, carbon dioxide, or carbon monoxide. Conventional foaming processes are believed to be becoming increasingly undesirable. For example, the use of these organic compounds has received heightened scrutiny due to potential environmental risks associated with the same. Moreover, conventional foaming processes often disadvantageously produce voids or cells within the materials that are relatively large, for example approximately 100 microns or greater, along with relatively wide variances of void fraction percentages. The number of voids per unit volume of the polymeric material may be relatively low and the distribution of cells through out the polymeric material is often non-uniform.

In order to address the above possible shortcomings, efforts have been made at employing inert fluids to facilitate foaming of polymeric materials such as proposed, for example, in U.S. Pat. No. 5,334,356 to Baldwin et al.; and U.S. Pat. No. 5,158,986 to Cha et al. In particular, the '986 patent proposes providing a non-thermosetting, polymerized plastic material to be foamed, introducing a supercritical fluid into the polymerized plastic material to be foamed at a first temperature and a first pressure, and then externally changing the temperature and pressure from the first temperature and first pressure to a different selected second pressure to produce a supermicrocellular foamed material. The foamed material is disclosed to contain a plurality of voids or cells distributed substantially throughout the material. U.S. Pat. No. 5,160,674 to Colton et al. proposes a method of producing a foamed semi-crystalline polymeric material containing a uniform, closed cell microcellular void. The method involves saturating a melted polymeric material at an elevated pressure at or about the melting temperature with a uniform concentration of gas such as carbon dioxide. U.S. Pat. No. 5,120,559 to Rizvvi et al. proposes extruding dough using supercritical carbon dioxide.

Notwithstanding the above efforts, there remains a need in the art to provide foamed materials with improved properties relative to materials formed by prior art processes. In particular, it would be especially desirable to be able to manipulate conditions other than temperature and pressure so as to customize the physical properties of the final product. It would also be desirable to employ a foaming process that eliminates the need for using organic solvents as blowing agents. There is also a need to reduce the saturation time in embodiments involving batch processes, and to control the distribution and sizes of cells in the foamed materials.

SUMMARY OF THE INVENTION

In one aspect, the invention provides a method of producing a foamed material. The method comprises contacting a material with a fluid mixture comprising carbon dioxide and a surfactant. The surfactant facilitates dissolution of the carbon dioxide into the material to foam the material.

In another aspect, the invention relates to a method of extrusion processing a material. The method comprises introducing solid material into the barrel of an extruder, heating the material to melt the material, and thereafter contacting the molten material with a fluid mixture comprising carbon dioxide and a surfactant. The surfactant facilitates the dissolution of the carbon dioxide into the molten material to foam the material.

Other aspects and advantages of the invention are set forth in detail herein.

DETAILED DESCRIPTION OF THE PREFERRED EMBODIMENTS

Figure 1:
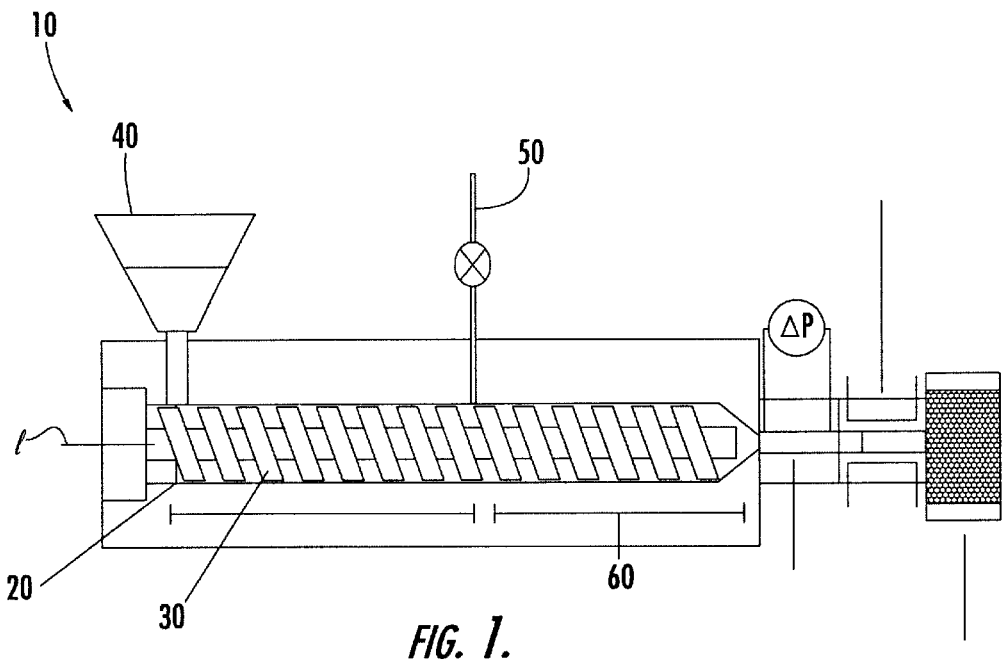
FIG. 1 illustrates an extruder to be used in accordance with the invention.

The present invention now will be described more fully hereinafter with reference to the accompanying specification, drawings, and examples, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art.

In one aspect, the invention relates to a method of producing a foamed material. The method comprises contacting a material with a fluid mixture comprising carbon dioxide and a surfactant, wherein the surfactant facilitates the dissolution of the carbon dioxide into the material to foam the material.

The fluid mixture is preferably homogeneous on the macroscopic scale, i.e., greater than about 1 micron. The use of the surfactant is believed to aid in lowering the interfacial tension between the carbon dioxide and the polymer.

In a preferred embodiment, a microcellular material is formed. For the purposes of the invention, the term "microcellular material" refers to material having an average cell size ranging from above 0 to about 500 microns, more preferably from about 1 to about 100 microns, and most preferably from about 0.1 to about 50 microns.

For the purposes of the invention, carbon dioxide is employed as a fluid in a liquid, gaseous, or supercritical phase. If liquid $CO_2$ is used, the temperature employed during the process is preferably below 31° C. If gaseous $CO_2$ is used, it is preferred that the phase be employed at high pressure. As used herein, the term "high pressure" generally refers to $CO_2$ having a pressure from about 50 to about 500 bar. In one embodiment, the $CO_2$ is utilized in a "supercritical" phase. As used herein, "supercritical" means that a fluid medium is above its critical temperature and pressure, i.e., about 31° C. and about 71 bar for $CO_2$. The thermodynamic properties of $CO_2$ are reported in Hyatt, *J. Org. Chem.* 49: 5097–5101 (1984); therein, it is stated that the critical temperature of $CO_2$ is about 31° C.; thus the method of the present invention may be carried out at a temperature above 31° C. For the purposes of the invention, it is preferred to employ $CO_2$ at a pressure ranging from at a lower end of about 20 or about 50 bar to an upper end of about 200 bar or about 1000 bar. In certain embodiments (e.g., extrusion), $CO_2$ may be introduced into a system at about 270 bar to about 340 bar. The pressure may then drop to about 100 bar to about 170 bar subsequent to introduction of the $CO_2$.

In some embodiments, it may be advantageous to carry out the invention at lower temperatures that may be subambient such as, for example, a range from about 15° C. to about 25° C., and more preferably about 15° C.

Materials that may be foamed as a result of the method of the invention are numerous and known in the art. For the purposes of the invention, the term "foamed material" refers to a material having a plurality of distinct void spaces formed therein. As an example, the material may be selected from the group consisting of a polymer, a metal, and food products such as, but not limited to, doughs employed in baking and pastas. Preferred metals include aluminum and alloys thereof. The material to be foamed may comprise a polymeric precursor such as, for example, a thermoset precursor. Exemplary thermoset precursors include, but are not limited to, epoxy resins, resole, novolacs, polyurethanes, and polyurea, which is often useful for coating materials such as powder coatings. The term "polymer" is to be broadly construed to include, but not be limited to, a homopolymer, copolymer, terpolymer, and the like. Crystalline, semicrystalline, and amorphous polymeric materials can all be foamed as a result of the method of the invention. Polymers that may be foamed include, for example, thermoplastic and thermoset polymers. A polymer that is foamed is preferably a thermoplastic polymer. Exemplary thermoplastic polymers include, but are not limited to, polyvinyl chloride, polyolefins (e.g., high and low density polyethylene, high and low density polypropylene, and the like), nylons, fluoropolymers such as, but not limited to, those described in U.S. Pat. No. 5,674,957 to DeSimone et al., the disclosure of which is incorporated herein by reference in its entirety (e.g., polyvinylidene fluoride, polyvinyl fluoride, polytetrafluoroethylene, polychlorotrifluoroethylene, polyhexafluoro-isobutylene, and others), polyurethane, polystyrene, polycarbonate, polyethylene terephthalate, polymethyl methacrylate, and cellulosic and acrylic resins. Blends and mixtures of the above may also be used. In general, the foamed materials may be useful in a number of forms such as, but not limited to, sheet form, tubes, cylinders, fibers, and non-wovens.

The surfactants which are employed by the processes of the invention are known to those skilled in the art. Preferably, the surfactants are non-ionic surfactants. Examples of suitable surfactants are set forth in U.S. Pat. Nos. 5,783,082; 5,589,105; 5,639,836; and 5,451,633 to DeSimone et al.; U.S. Pat. Nos. 5,676,705; and 5,683,977 to Jureller et al., the disclosures of which are incorporated herein by reference in their entirety. In general, the surfactant may encompass any macromolecule that serves to emulsify, that may be polymeric or non-polymeric.

Preferably, the surfactant has a segment that has an affinity for the material it comes in contact with, or, stated differently, a "$CO_2$-phobic segment". In embodiments wherein thermoplastic polymers are foamed, the "$CO_2$-phobic" segment has an affinity for the polymer material. Exemplary $CO_2$-phobic segments may comprise common lipophilic, oleophilic, and aromatic polymers, as well as oligomers formed from monomers such as ethylene, α-olefins, styrenics, acrylates, methacrylates, ethylene oxides, isobutylene, vinyl alcohols, acrylic acid, methacrylic acid, and vinyl pyrrolidone. The $CO_2$-phobic segment may also comprise molecular units containing various functional groups such as amides; esters; sulfones; sulfonamides; imides; thiols; alcohols; dienes; diols; acids such as carboxylic, sulfonic, and phosphoric; salts of various acids; ethers; ketones; cyanos; amines; quaternary ammonium salts; and thiozoles. Mixtures of any of these components can make up the "$CO_2$-phobic segment". If desired, the surfactant may comprise a plurality of "$CO_2$-phobic" segments. In such an embodiment, each segment could have an affinity for different polymeric resins used in a blend of thermoplastic material.

If desired, the surfactant may comprise a segment that has an affinity for carbon dioxide, or a "$CO_2$-philic" segment. Exemplary $CO_2$-philic segments may include a halogen (e.g., fluoro or chloro)-containing segment, a siloxane-containing segment, a branched polyalkylene oxide segment, or mixtures thereof. Examples of "$CO_2$-philic" segments are set forth in U.S.

Pat. Nos. 5,676,705; and 5,683,977 to Jureller et al. If employed, the fluorine-containing segment is typically a "fluoropolymer". As used herein, a "fluoropolymer" has its conventional meaning in the art and should also be understood to include low molecular weight oligomers, i.e., those which have a degree of polymerization greater than or equal to two. See generally Banks et al., *Organofluorine Compounds: Principals and Applications* (1994); see also *Fluorine-Containing Polymers*, 7 Encyclopedia of Polymer Science and Engineering 256 (H. Mark et al. Eds. 2d Ed. 1985). Exemplary fluoropolymers are formed from monomers which may include fluoroacrylate monomers such as 2-(N-ethylperfluorooctane-sulfonamido) ethyl acrylate ("EtFOSEA"), 2-(N-ethylperfluorooctane-sulfonamido) ethyl methacrylate ("EtFOSEMA"), 2-(N-ethylperfluorooctane-sulfonamido) ethyl acrylate ("MeFOSEA"), 2-(N-ethylperfluorooctane-sulfonamido) ethyl methacrylate ("MeFOSEMA"), 1,1'-dihydroperfluorooctyl acrylate ("FOA"), 1,1'-dihydroperfluorooctyl methacrylate ("FOMA"), 1,1',2,2'-tetrahydroperfluoroalkylacrylate, 1,1',2,2'-tetrahydroperfluoroalkyl-methacrylate and other fluoromethacrylates; fluorostyrene monomers such as α-fluorostyrene and 2,4,6-trifluoromethylstyrene; fluoroalkylene oxide monomers such as hexafluoropropylene oxide and perfluorocyclohexane oxide; fluoroolefins such as tetrafluoroethylene, vinylidine fluoride, and chlorotrifluoroethylene; and fluorinated alkyl vinyl ether monomers such as perfluoro(propyl vinyl ether) and perfluoro(methyl vinyl ether). Copolymers using the above monomers may also be employed. Exemplary siloxane-containing segments include alkyl, fluoroalkyl, and chloroalkyl siloxanes. More specifically, dimethyl siloxanes and polydimethylsiloxane materials are useful. Mixtures of any of the above may be used. In certain embodiments, the "$CO_2$-philic" segment may be covalently linked to the "$CO_2$-phobic" segment.

Surfactants that are suitable for the invention may be in the form of, for example, homo, random, block (e.g., di-block, tri-block, or multi-block), blocky (those from step growth polymerization), and star homopolymers, copolymers, and co-oligomers. Exemplary homopolymers include, but are not limited to, poly(1,1'-dihydroperfluorooctyl acrylate) ("PFOA"), poly(1,1'-dihydroperfluorooctyl methacrylate) ("PFOMA"), poly(2-(N-ethylperfluorooctanesulfonamido) ethyl methacrylate) ("PEtFOSEMA"), and poly(2-(N-ethylperfluorooctane sulfonamido) ethyl acrylate) ("PEtFOSEA"). Exemplary block copolymers include, but are not limited to, polystyrene-b-poly(1,1-dihydroperfluorooctyl acrylate), polymethyl methacrylate-b-poly(1,1-dihydroperfluorooctyl methacrylate), poly(2-(dimethylamino)ethyl methacrylate)-b-poly(1,1-dihydroperfluorooctyl methacrylate), and a diblock copolymer of poly(2-hydroxyethyl methacrylate) and poly(1,1-dihydroperfluorooctyl methacrylate). Statistical copolymers of poly(1,1-dihydroperfluoro octyl acrylate) and polystyrene, along with poly(1,1-dihydroperfluorooctyl methacrylate) and poly(2-hydroxyethyl methacrylate) can also be used. Graft copolymers may be also be used and include, for example, poly(styrene-g-dimethylsiloxane), poly(methyl acrylate-g-1,1' methacrylate), and poly(1,1'-dihydroperfluorooctyl acrylate-g-styrene). Random copolymers may be employed and examples of such include, but are not limited to, copolymers or terpolymers of tetrafluoroethylene, vinylidene fluoride, hexafluoropropylene, chlorotrifluoroethylene, and ethylene. Other examples can be found in I. Piirma, *Polymeric Surfactants* (Marcel Dekker 1992); and G. Odian, *Principals of Polymerization* (John Wiley and Sons, Inc. 1991). It should be emphasized that non-polymeric molecules may be used such as perfluoro octanoic acid, surfynols, perfluoro(2-propoxy propanoic) acid, fluorinated alcohols and diols, along with various fluorinated acids, ethoxylates, amides, glycosides, alkanolamides, quaternary ammonium salts, amine oxides, and amines. Commercially preferred surfactants include, for example those in the Zonyl® series sold by E.I. Du Pont de Nemours of Wilmington, Del. and those in the Fluorad® series sold by Minnesota Mining and Manufacturing of St. Paul, Minn. Mixtures of any of the above may be used. Various components which are suitable for the process of the invention are encompassed by the class of materials described in E. Kissa, *Fluorinated Surfactants: Synthesis, Properties, and Applications* (Marcel Dekker 1994). For the purposes of the invention, two or more surfactants may be employed in the invention. Edible surfactants may also be used.

Depending on the number of different type of polymers or polymer resins present in a blend thermoplastic material, the surfactant can comprise multiple blocks or segments which may be equal to the number of polymers or resins present in the blend. As an example, if two polymers or polymer resins are present as a blend, the surfactant may comprise two blocks or segments wherein each has an affinity for each polymer or polymer resin. If three polymers or polymer resins are employed, the surfactant may comprise three blocks or segments, and so on. In these embodiments, the surfactant may also include a "$CO_2$-philic" segment.

Although a number of examples of surfactants listed herein are in the form of block, random, or graft copolymers, it should be appreciated that other copolymers that are not block, random, or graft may be used.

The amount of surfactant that is used in the fluid mixture may be selected from various values. Preferably, the fluid mixture comprises from about 0.0001 to about 10 percent by weight of the surfactant, and more preferably from about 0.01 to about 2 percent by weight. It should be appreciated that this amount depends on several factors including the stability of the surfactant and desired end product.

Applicants have found that using a surfactant affords many unexpected advantages. By virtue of being present in the fluid mixture, the surfactant is able to reduce the surface tension between the material (e.g., thermoplastic polymer or polymer blend) and carbon dioxide. Thus, the surfactant is able to enhance the dissolution, entrainment, or solubility of the carbon dioxide in the material. Moreover, the reduction in surface tension is also able to modify the final foam structure of the solid foamed material. Also, employing a surfactant aids in controlling the porosity of the foamed material. The surfactant is also capable of modifying the nucleation and/or growth rates of the voids in the materials. In the event that two or more materials are employed (e.g., thermoplastic resins), the surfactant can also be used to improve the blend compatibility between these materials in the fluid mixture, both during and after the foaming process takes place. The surfactant is also able to facilitate a reduction in viscosity of the material in the fluid mixture prior to foaming. In addition, the surfactant may act as a control parameter of the final foamed material.

The fluid mixture may also comprise components in addition to those described above. Exemplary components include, but are not limited to, polymer modifier, water, toughening agents, colorants, dyes, biological agents, rheology modifiers, plasticizing agents, flame retardants, antibacterial agents, flame retardants, and viscosity reduction modifiers. Co-solvents and co-surfactants may also be employed.

Exemplary co-solvents that could be used include, but are not limited to, alcohols (e.g., methanol, ethanol, and isopropanol); fluorinated and other halogenated solvents (e.g., chlorotrifluoromethane, trichlorofluoromethane, perfluoropropane, chlorodifluoromethane, and sulfur hexafluoride); amines (e.g., N-methyl pyrrolidone); amides (e.g., dimethyl acetamide); aromatic solvents (e.g., benzene, toluene, and xylenes); esters (e.g., ethyl acetate, dibasic esters, and lactate esters); ethers (e.g., diethyl ether, tetrahydrofuran, and glycol ethers); aliphatic hydrocarbons (e.g., methane, ethane, propane, olefins (e.g., ethylene and propylene); natural hydrocarbons (e.g., isoprenes, terpenes, and d-limonene); ketones (e.g., acetone and methyl ethyl ketone); organosilicones; alkyl pyrrolidones (e.g., N-methyl pyrrolidone); paraffins (e.g., isoparaffin); petroleum-based solvents and solvent mixtures; and any other compatible solvent or mixture that is available and suitable. Mixtures of the above co-solvents may be used.

Exemplary co-surfactants that may possibly be used include, but are not limited to, longer chain alcohols (i.e., greater than $C_8$) such as octanol, decanol, dodecanol, cetyl, laurel, and the like; and species containing two or more alcohol groups or other hydrogen bonding functionalities; amides; amines; and other like components. Suitable other types of materials that are useful as co-surfactants are well known by those skilled in the art, and may be employed in the process of the present invention. Mixtures of the above may be used. When employed, the co-surfactant may be in the form of a compatibilizer. With respect to the present invention, a compatibilizer aids in helping a blend of thermoplastic polymers to be foamed retain its stability particularly after the carbon dioxide has been vented to the atmosphere. The compatibilizer can be utilized in a number of ways. In one embodiment, the compatibilizer may be premade and mixed in with the blend of polymers. In another embodiment, the compatibilizer can be formed during any of the methods of the invention. In this instance, reactive groups are present on the polymer blend to be foamed, with the reactive groups subsequently reacting to provide compatibilization.

The invention can be employed in conjunction with a number of processes including, but not limited to, extrusion, pultrusion, injection molding, and in the manufacture of non-wovens and multilayer foamed materials. The invention may be carried out as a batch, semicontinuous, or continuous process.

Extrusion

An embodiment of the invention describing an extrusion process will now be described in detail with respect FIG. 1. The extruder 10 is a conventional extruder which has a barrel 20 with a screw 30 positioned therein. Solid material, typically in the form of pellets, is introduced into the extruder via hopper assembly 40. The extrusion barrel is heated to conditions such that the material becomes molten. In the event that thermoplastic material is used, the material often becomes plasticized. The material is then mixed in the barrel by virtue of the motion screw 30 which transports the molten material along the longitudinal axis I of the barrel. Carbon dioxide is subsequently introduced to the barrel 20 of extruder 10 through inlet 50. The carbon dioxide may be in various states (e.g., gaseous, liquid, or supercritical). It may be desirable to preheat the carbon dioxide before insertion to prevent too sudden an increase in pressure in the barrel 20 at a higher temperature of the barrel 20. The surfactant and other optional additives are typically introduced into the extruder in combination with the carbon dioxide although other techniques of introducing the surfactant and other optional additives may be employed.

The carbon dioxide and the molten material are then mixed in a section 60 of the barrel 20 downstream of inlet 50. In section 60, the carbon dioxide penetrates or diffuses into the material. This mixing continues as the carbon dioxide and material passed through adapter 70 having a static mixer present therein. The carbon dioxide and molten material is typically a single phase at this stage. Although not being bound by any theory, it is believed that convective diffusion helps to completely dissolve the carbon dioxide in the material. The mixture of material and carbon dioxide is then transported to heat exchanger 80. In this embodiment, heat exchanger 80 employs circulating fluid denoted by the arrows x and y, although other variations of this embodiment may be encompassed by the invention. In an embodiment wherein the material is a thermoplastic polymer, the temperature of the carbon dioxide/polymer mixture is cooled to near the polymer glass transition temperature ($T_g$) at which point the viscosity of the polymer is observed to increase dramatically.

The carbon dioxide/material mixture then passes through nozzle 90 and nucleation die 100. During this time, the material typically experiences a rapid pressure drop and hence a sudden decrease in the solubility of the carbon dioxide in the material. Accordingly, a large number of bubbles usually nucleate almost instantaneously in the matrix of the material, and as a result a foamed material is formed upon exiting die 100. The foamed material may be further processed in an article of manufacture as desired by the end user.

Injection Molding

Figure 2:
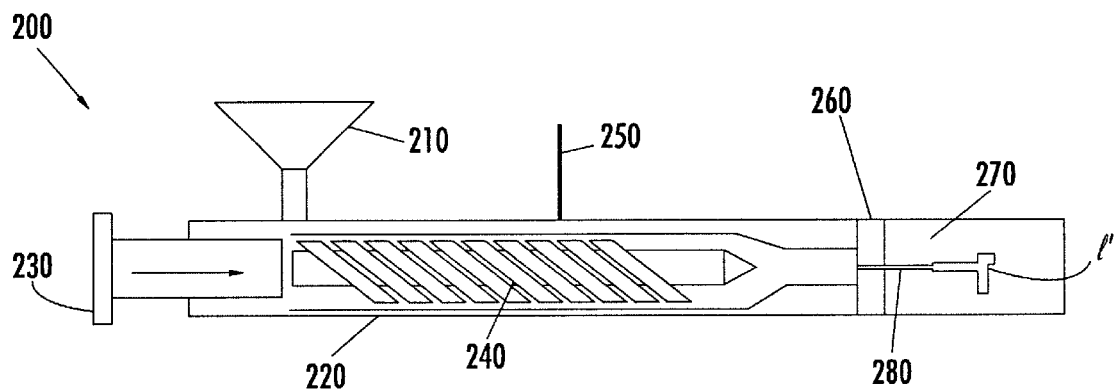
FIG. 2 illustrates an injection molding device to be used in accordance with the invention.

FIG. 2 illustrates an injection molding device 200 that may be used in accordance with the method of the invention. Solid material, preferably thermoplastic material, is fed into the chamber 220 of the injection molding device 200 via hopper 210. The solid material is typically present in the form of pellets. The chamber is heated by a suitable technique such that the solid material is melted. Hydraulic cylinder 230 applies pressure to screw 240 such that the molten material becomes sufficiently mixed.

Carbon dioxide is then introduced into chamber 220 through line 250 along with a surfactant and other suitable additive if desirable. The carbon dioxide is then mixed with the molten polymer along the longitudinal axis I' of chamber 220 by virtue of the rotation of screw 240. If carbon dioxide is employed at high pressure (e.g., in a liquid or supercritical phase), the chamber should be modified to withstand such conditions. For example, employing a nozzle 260 at the exit of the chamber 220 can be used to create a sufficient level of back pressure. Other design modifications may be made as known by the skilled artisan.

The polymer/carbon dioxide mixture then is injected through nozzle 260 into molding cavity 270 that is shaped in the form of a desired article of manufacture. As known in the art, toward the end of the injection cycle, the pressure in the molding cavity tends to rise rapidly and the material cools and solidifies such that the material foams. At the conclusion of the molding cycle, the molding cavity is separated from the device wherein the carbon dioxide is separated (e.g., vented) from the solid foamed article. For example, the carbon dioxide may be vented using port 280. The resulting article can then be further processed or sold commercially according to the intentions of the manufacturer.

Pultrusion

Figure 3:
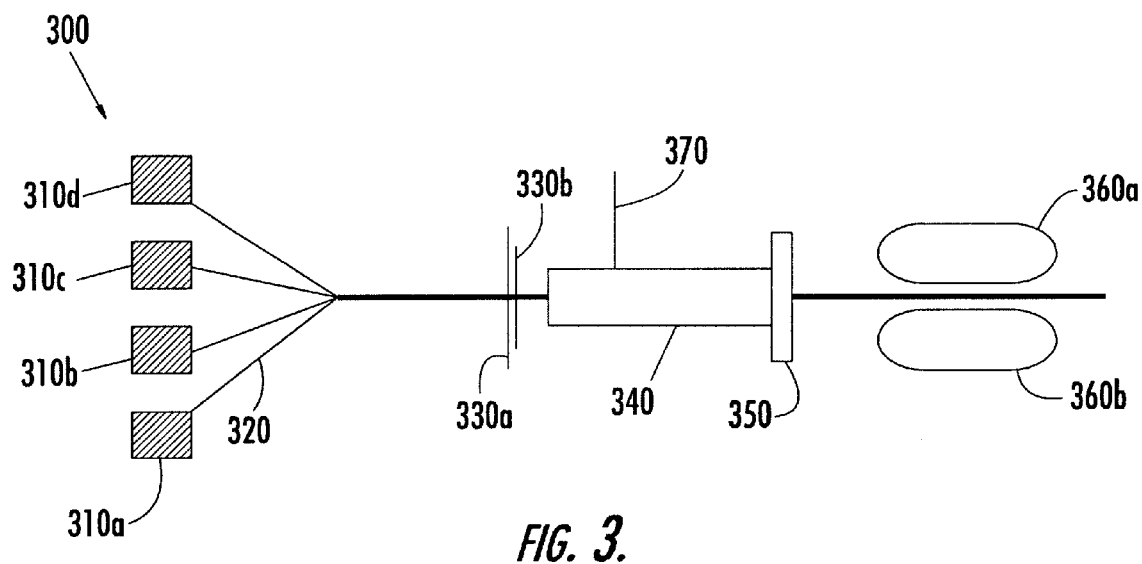
FIG. 3 illustrates a pultrusion device to be used in accordance with the invention.

FIG. 3 illustrates a pultrusion device 300 that may be used in accordance with the invention. Support material, which is typically reinforcing fiber 320 is contained in a plurality of spools 310a–d, although other structures may be employed. Examples of materials employed as reinforcing fiber include, but are not limited to, glass, carbon, metal, aromatic polyamides, polybenzimidazoles, aromatic polyimides, and nylon. Blends and combinations thereof may also be used.

From the spools 310a–d, the reinforcing fiber 320 is guided via a pair or guides 330a and 330b to bath 340 containing molten material, typically thermosetting or thermoplastic material. The bath may be heated by using a technique that is suitable in the art to maintain the material in a molten state. A mixture of carbon dioxide, surfactant, and at least one optional additive is injected from line 370 into the bath 340, and the components are sufficiently mixed with the material using an appropriate stirring device or method such that the carbon dioxide dissolves into the material. In the bath, the material also impregnates the reinforcing fiber. Pullers 360a and 360b are employed to transport the fiber through the bath. In the event that carbon dioxide is employed at high pressure (e.g., in a liquid or supercritical phase), the bath should be modified to withstand such pressure conditions. As an example, a nozzle 350 at the exit of bath 340 can be used to create a sufficient level of back pressure. Other design modifications may be made as known by one skilled in the art.

Upon exit from bath 340, the impregnated reinforced fiber 320 experiences a decrease in pressure, and accordingly the material present in the fiber foams. The fiber 320 may then be used to form various structures; for example, the fiber may be bundled into a core structure that can be used in any number of suitable applications.

Batch

Figure 4:
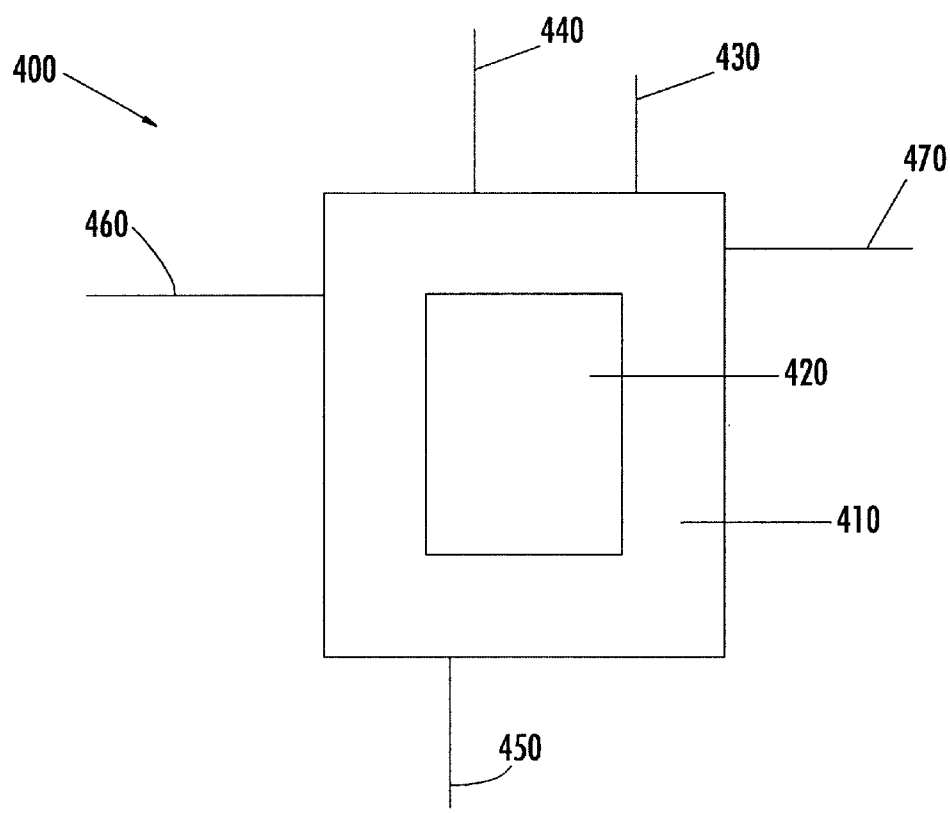
FIG. 4 illustrates a batch reactor to be employed in accordance with the invention.

FIG. 4 illustrates a batch reactor 400 that may be used in foaming a material. In this embodiment, the reactor 400 includes a chamber 410 that houses material to be foamed, carbon dioxide, surfactant, along with other possible additives. The material is typically inserted into the chamber 410 through door 420. The batch reactor also includes thermocouple 430, pressure transducer 440, and rupture disk 450. Optionally, a mixer or agitator (not pictured) may be employed during the process. A conventional heater is also employed in conjunction with the batch reactor 400.

As alluded to, the material is first placed into chamber 410 and the door is closed. The material is then heated such that it is subsequently present in a molten state. As an alternative, the material may be introduced into the reactor already melted. Carbon dioxide is then introduced into the chamber 410 via inlet 460 to a pressure that may be set by the end user. The pressure is usually set such that the carbon dioxide dissolves into the material. Surfactant is also present in the system, and can be introduced into the reactor through a number of different ways. For example, the surfactant may be introduced along with the material, may be introduced with the carbon dioxide, or may be introduced via a separate line in fluid communication with the chamber 410.

The material is typically pressurized with carbon dioxide for a length of time suitable to allow for a level of dissolution of the carbon dioxide into the material to allow for certain end properties to be attained in the resulting foam material. After the time period, the carbon dioxide is vented through outlet 470. After depressurization, the foamed material is collected and prepared for end use through suitable downstream processes known to the skilled artisan.

In another aspect, the invention relates to a composition of matter. The composition of matter comprises a thermoplastic material; and a fluid mixture comprising carbon dioxide, and a surfactant, wherein the fluid mixture is intimately mixed with the thermoplastic material. The surfactant facilitates penetration of the carbon dioxide into the thermoplastic material to foam the thermoplastic material. The composition of matter is present as a single (e.g., homogeneous) phase. Examples of the above components employed in the composition of matter are provided herein.

The invention will now be described in greater detail with respect to the examples. It should be understood that the examples are for the purposes of illustration, and in no way limit the invention that is described by the claims.

EXAMPLE 1

A sample of polystyrene is inserted in a batch reactor and the reactor is heated to 200° C. A 0.5 weight percent sample of surfactant (polystyrene-poly(FOMA)) is mixed therein. The cell is cooled to 100° C. Carbon dioxide is injected into the reactor at 3000 psi, and the cell is allowed to equilibrate. The cell is vented rapidly, and foamed material produced as a result of the process is removed.

EXAMPLE 2

The procedure according to Example 1 is carried out except that carbon dioxide and surfactant are injected to the reactor simultaneously.

EXAMPLE 3

The procedure according to Example 1 is carried out except that the cell is equilibrated at 200° C., then cooled, and then vented.

EXAMPLE 4

The procedure according to Example 1 is carried out except that polyvinyidene fluoride is foamed.

EXAMPLE 5

The procedure according to Example 1 is carried out except that aluminum is foamed.

EXAMPLE 6

The procedure according to Example 1 is carried out except that polycarbonate is foamed.

EXAMPLE 7

The procedure according to Example 1 is carried out except that polyethylene terephthalate is foamed.

EXAMPLE 8

The procedure according to Example 1 is carried out except that polymethyl methacrylate is foamed.

EXAMPLE 9

The procedure according to Example 1 is carried out except that high density polyethylene is foamed.

EXAMPLE 10

The procedure according to Example 1 is carried out except that low density polyethylene is foamed.

EXAMPLE 11

The procedure according to claim 1 is carried out except that a thermoset precursor is foamed.

EXAMPLES 12–22

Examples 1–11 are repeated except that a block copolymer of polystyrene and PTFE is employed as a surfactant.

EXAMPLES 23–33

Examples 1–11 are repeated except that a block copolymer of polystyrene and PDMS is employed as a surfactant.

EXAMPLE 34

An extruder is loaded with polystyrene and a block copolymer of polystyrene and poly(FOMA) as surfactant. The polymers are melted at 200° C. Carbon dioxide is injected at 25° C., 4500 psi such that the polymer/surfactant/carbon dioxide mixture forms a homogeneous phase having 5 percent by weight of surfactant. The extruded mixture is cooled to 150° C., and exits via a nozzle.

EXAMPLE 35

The procedure according to Example 34 is carried out except that polyvinyidene fluoride is foamed.

EXAMPLE 36

The procedure according to Example 34 is carried out except that polycarbonate is foamed.

EXAMPLE 37

The procedure according to Example 34 is carried out except that polyethylene terephthalate is foamed.

EXAMPLE 38

The procedure according to Example 34 is carried out except that polymethyl methacrylate is foamed.

EXAMPLE 39

The procedure according to Example 34 is carried out except that aluminum is foamed.

EXAMPLE 40

The procedure according to Example 34 is carried out except that high density polyethylene is foamed.

EXAMPLE 41

The procedure according to Example 34 is carried out except that low density polyethylene is foamed.

EXAMPLE 42

The procedure according to Example 34 is carried out except that a thermoset precursor is foamed.

EXAMPLES 43–51

Examples 34–42 are repeated except that a block copolymer of polystyrene and PTFE is employed as a surfactant.

EXAMPLES 52–60

Examples 34–42 are repeated except that a block copolymer of polystyrene and PDMS is employed as a surfactant.

The invention is illustrated by reference to the above embodiments. It should be appreciated however that the invention is not limited to these embodiments but is instead defined by the claims that follow.

That which is claimed:

1. A method of producing a foamed material, said method comprising:
    contacting a material to be foamed with a fluid mixture comprising carbon dioxide and a surfactant comprising a $CO_2$-philic segment which has affinity for carbon dioxide and a $CO_2$-phobic segment having affinity for the material to be foamed, wherein the surfactant facilitates the dissolution of the carbon dioxide into the material to lower the interfacial tension between the carbon dioxide and the material to be foamed; and then
    foaming the material, wherein the material has a plurality of distinct void spaces formed therein having an average cell size of from about 0.1 to about 50 microns.

2. The method according to claim 1, wherein the carbon dioxide is liquid carbon dioxide.

3. The method according to claim 1, wherein the carbon dioxide is supercritical carbon dioxide.

4. The method according to claim 1, wherein the material is a thermoplastic polymer.

5. The method according to claim 1, wherein the material comprises a thermoset precursor.

6. The method according to claim 1, wherein the material is a fluoropolymer.

7. The method according to claim 1, wherein the $CO_2$-philic segment comprises a component selected from the group consisting of a fluoropolymer, a silicone, a polypropylene oxide, and mixtures thereof.

8. The method according to claim 7, wherein the fluoropolymer is formed from at least one monomer selected from the group consisting of fluoroacrylate monomers, fluoroolefin monomers, fluorostyrene monomers, fluoroalkylene oxide monomers, fluorinated vinyl alkyl ether monomers, and mixtures thereof.

9. The method according to claim 1, wherein the $CO_2$-phobic segment is a polymer formed from at least one monomer selected from the group consisting of styrenics, α-olefins, ethylene oxides, dienes, amides, esters, sulfones, sulfonamides, imides, thiols, alcohols, diols, acids, ethers, ketones, cyanos, amines, quaternary ammonium salts, acrylates, methacrylates, thiozoles, and mixtures thereof.

10. The method according to claim 1, wherein the surfactant is a copolymer selected from the group consisting of a graft copolymer, a block copolymer, and a random copolymer.

11. The method according to claim 1, wherein the fluid mixture further comprises a modifier selected from the group consisting of a reactant modifier, water, a plasticizing agent, an anti-bacterial agent, a toughening agent, a processing aid, a colorant, a dye, a flame retardant, and mixtures thereof.

12. The method according to claim 1, wherein the material is a thermoplastic material that comprises at least two resins.

13. The method according to claim 1, wherein the fluid mixture further comprises a cosolvent.

14. The method according to claim 1, further comprising the step of separating the material from the carbon dioxide.

15. The method according to claim 14, wherein said step of separating the carbon dioxide from the material comprises venting the carbon dioxide.

16. A method of extrusion processing a material, said process comprising:
    introducing a solid material to be foamed into an extruder barrel;
    heating the material to form molten material;
    contacting the molten material with a fluid mixture comprising carbon dioxide and a surfactant comprising a $CO_2$-philic segment having affinity for carbon dioxide and a $CO_2$-phobic segment having affinity for the material to be foamed, wherein the surfactant facilitates the dissolution of the carbon dioxide into the molten material to foam the molten material; and then
    foaming said molten material, wherein the material has a plurality of distinct void spaces formed therein having an average cell size of from about 0.1 to about 50 microns.

17. The method according to claim 16, wherein the step of contacting the molten material with the fluid mixture occurs in a mixing section of the extruder.

18. The method according to claim 16, further comprising the step of separating the carbon dioxide from the molten material to provide a solid foamed material.

19. The method according to claim 16, wherein the carbon dioxide is liquid carbon dioxide.

20. The method according to claim 16, wherein the carbon dioxide is supercritical carbon dioxide.

21. The method according to claim 16, wherein the material is a thermoplastic polymer.

22. The method according to claim 16, wherein the material is a fluoropolymer.

23. The method according to claim 16, wherein the material comprises a thermoset precursor.

24. The method according to claim 16, wherein said step of contacting the molten material comprises contacting a molten thermoplastic material with a fluid mixture comprising carbon dioxide and a surfactant such that the surfactant lowers the interfacial tension between the thermoplastic material and the carbon dioxide.

25. The method according to claim 16, wherein the $CO_2$-phobic segment is a polymer formed from at least one monomer selected from the group consisting of styrenics, α-olefins, ethylene oxides, dienes, amides, esters, sulfones, sulfonamides, imides, thiols, alcohols, diols, acids, ethers, ketones, cyanos, amines, quaternary ammonium salts, acrylates, methacrylates, thiozoles, and mixtures thereof.

26. The method according to claim 16, wherein the surfactant is a copolymer selected from the group consisting of a graft copolymer, a block copolymer, and a random copolymer.

27. The method according to claim 16, wherein the material is a thermoplastic material in the form of at least two resins.

28. The method according to claim 16, wherein the fluid mixture further comprises a cosolvent.

29. The method according to claim 16, wherein the fluid mixture further comprises a modifier selected from the group consisting of a reactant modifier, a plasticizing agent, an anti-bacterial agent, water, a toughening agent, a processing aid, a flame retardant, a colorant, a dye, and mixtures thereof.

30. A method of extrusion processing a material, said process comprising:
   introducing a solid material to be foamed into an extruder barrel;
   heating the material to form molten material;
   contacting the molten material with a fluid mixture comprising carbon dioxide and a surfactant comprising a $CO_2$-philic segment having affinity for carbon dioxide and a $CO_2$-phobic segment having affinity for the material to be foamed, the $CO_2$-philic segment comprising a fluoropolymer, and wherein the surfactant facilitates the dissolution of the carbon dioxide into the molten material to foam the molten material; and then foaming said molten material, wherein the material has a plurality of distinct void spaces formed therein having an average cell size of from about 0.1 to about 50 microns.

31. The method according to claim 30, wherein the step of contacting the molten material with the fluid mixture occurs in a mixing section of the extruder.

32. The method according to claim 30, further comprising the step of separating the carbon dioxide from the molten material to provide a solid foamed material.

33. The method according to claim 30, wherein the carbon dioxide is liquid carbon dioxide.

34. The method according to claim 30, wherein the carbon dioxide is supercritical carbon dioxide.

35. The method according to claim 30, wherein the fluoropolymer is formed from at least one monomer selected from the group consisting of fluoroacrylate monomers, fluoroolefin monomers, fluorostyrene monomers, fluoroalkylene oxide monomers, fluorinated vinyl alkyl ether monomers, and mixtures thereof.

36. The method according to claim 30, wherein the material is a fluoropolymer.

37. The method according to claim 30, wherein the material is a thermoplastic polymer.

38. The method according to claim 30, wherein the material comprises a thermoset precursor.

39. The method according to claim 30, wherein said step of contacting the molten material comprises contacting a molten thermoplastic material with a fluid mixture comprising carbon dioxide and a surfactant such that the surfactant lowers the interfacial tension between the thermoplastic material and the carbon dioxide.

40. The method according to claim 30, wherein the $CO_2$-phobic segment is a polymer formed from at least one monomer selected from the group consisting of styrenics, α-olefins, ethylene oxides, dienes, amides, esters, sulfones, sulfonamides, imides, thiols, alcohols, diols, acids, ethers, ketones, cyanos, amines, quaternary ammonium salts, acrylates, methacrylates, thiozoles, and mixtures thereof.

41. The method according to claim 30, where in the fluid is a copolymer selected from the group consisting of a copolymer, a block copolymer, and a random copolymer.

42. The method according to claim 30, wherein the material is a thermoplastic material in the form of at least two resins.

43. The method according to claim 30, wherein the fluid mixture further comprises a cosolvent.

44. The method according to claim 30, wherein the fluid mixture further comprises a modifier selected from the group consisting of a reactant modifier, a plasticizing agent, an antibacterial agent, water, a toughening agent, a processing aid, a flame retardant, a colorant, a dye, and mixtures thereof.

45. A composition of matter comprising:
   a thermoplastic material; and
   a fluid mixture comprising carbon dioxide, and a surfactant, wherein the fluid mixture and the thermoplastic polymer are intimately mixed such that the composition is present as a single phase, and wherein the surfactant comprises a $CO_2$-philic segment having affinity for carbon dioxide e and a $CO_2$-phobic segment having affinity for the material to be foamed, wherein the $CO_2$-phobic segment comprises a fluoropolymer and wherein the surfactant facilitates penetration of the carbon dioxide into the thermoplastic material to foam the thermoplastic material.

46. The composition according to claim 45, wherein the carbon dioxide is liquid carbon dioxide.

47. The composition according to claim 45, wherein the carbon dioxide is supercritical carbon dioxide.

48. The composition according to claim 45, wherein the fluoropolymer is formed from at least one monomer selected from the group consisting of fluoroacrylate monomers, fluoroolefin monomers, fluorostyrene monomers, fluoroalkylene oxide monomers, fluorinated vinyl alkyl ether monomers, and mixtures thereof.

49. The composition according to claim 45, wherein the $CO_2$-phobic segment is a polymer formed from at least one monomer selected from the group consisting of styrenics, α-olefins, ethylene and propylene oxides, dienes, amides, esters, sulfones, sulfonamides, imides, thiols, alcohols, diols, acids, ethers, ketones, cyanos, amines, quaternary ammonium salts, acrylates, methacrylates, thiozoles, and mixtures thereof.

50. The composition according to claim 45, wherein the surfactant is a copolymer selected from the group consisting of a graft copolymer and a block copolymer.

51. The composition according to claim 45, wherein the thermoplastic material is a blend of at least two resins.

52. The composition according to claim 45, wherein fluid mixture further comprises a cosolvent.

53. A method of producing a foamed material, said method comprising:
   contacting a material to be foamed with a fluid mixture comprising carbon dioxide and a surfactant comprising a $CO_2$-philic segment which has affinity for carbon dioxide arid a $CO_2$-phobic segment having affinity for the material to be foamed, the $CO_2$-philic segment comprising a fluoropolymer, and wherein the surfactant facilitates the dissolution of the carbon dioxide into tile material to lower the interfacial tension between the carbon dioxide and the material to be foamed; and then
   foaming the material, wherein the material has a plurality of distinct void spaces formed therein having an average cell size of from about 0.1 to about 50 microns.

54. The method according to claim 53, wherein the carbon dioxide is liquid carbon dioxide.

55. The method according to claim 53, wherein the carbon dioxide is supercritical carbon dioxide.

56. The method according to claim 53, wherein the material is a thermoplastic polymer.

57. The method according to claim 53, wherein the material comprises a thermoset precursor.

58. The method according to claim 53, wherein the material is a fluoropolymer.

59. The method according to claim 53, wherein the fluoropolymer present in the $CO_2$-philic segment is formed from at least one monomer selected from the group consisting of fluoroacrylate monomers, fluoroolefin monomers, fluorostyrene monomers, fluoroalkylene oxide monomers, fluorinated vinyl alkyl ether monomers, and mixtures thereof.

60. The method according to claim 53, wherein the $CO_2$-phobic segment is a polymer formed from at least one monomer selected from the group consisting of styrenics, α-olefins, ethylene oxides, dienes, amides, esters, sulfones, sulfonamides, imides, thiols, alcohols, diols, acids, ethers, ketones, cyanos, amines, quaternary ammonium salts, acrylates, methacrylates, thiozoles, and mixtures thereof.

61. The method according to claim 53, wherein the surfactant is a copolymer selected from the group consisting of a graft copolymer, a block copolymer, and a random copolymer.

62. The method according to claim 53, wherein fluid mixture further comprises a modifier selected from the group consisting of a reactant modifier, water, a plasticizing agent, an anti-bacterial agent, a toughening agent, a processing aid, a colorant, a dye, a flame retardant, and mixtures thereof.

63. The method according to claim 53, wherein the material is a thermoplastic material that comprises at least two resins.

64. The method according to claim 53, wherein the fluid mixture further comprises a cosolvent.

65. The method according to claim 53, further comprising the step of separating the material from the carbon dioxide.

66. The method according to claim 65, wherein said step of separating the carbon dioxide from the material comprises venting the carbon dioxide.

* * * * *